United States Patent [19]
Ku

[11] Patent Number: 6,089,708
[45] Date of Patent: Jul. 18, 2000

[54] EYEGLASSES FRAME HAVING AUXILIARY EYEGLASSES

[76] Inventor: Kuo-Sheng Ku, No. 201, Kuo An Street, Tainan, Taiwan

[21] Appl. No.: 09/456,571

[22] Filed: Dec. 8, 1999

[51] Int. Cl.⁷ .................................................. G02C 9/00
[52] U.S. Cl. ................................................ 351/47; 351/57
[58] Field of Search ........................ 351/47, 57, 48, 351/58, 44, 41, 158

[56] References Cited

U.S. PATENT DOCUMENTS

| | | | |
|---|---|---|---|
| 5,100,224 | 3/1992 | Terrasi | 351/47 |
| 5,258,786 | 11/1993 | Penrod | 351/47 |
| 5,438,378 | 8/1995 | Blatter | 351/47 |
| 5,568,207 | 10/1996 | Chao | 351/47 |
| 5,696,571 | 12/1997 | Spencer et al. | 351/47 |
| 5,737,054 | 4/1998 | Chao | 351/47 |
| 5,867,244 | 2/1999 | Martin | 351/47 |

*Primary Examiner*—Hung Xuan Dang
*Attorney, Agent, or Firm*—Rosenberg, Klein & Lee

[57] ABSTRACT

An eyeglasses frame having auxiliary eyeglasses includes a main frame, a connecting member and a pair of auxiliary eyeglasses. The connecting member has rear connecting plates connected to the bridge of the main frame. The connecting member has a resilient front connecting part having a holding room; the holding room has a polygon-shaped inner wall. The auxiliary eyeglasses have a connecting rod member connected to the lens thereof The connecting rod member has a polygon-shaped intermediate portion at least slightly bigger than the holding room. The intermediate portion is passed into the holding room for connecting the auxiliary eyeglasses to the main frame. The polygon shapes of both the intermediate portion and the holding room permit the auxiliary eyeglasses to be located in a not-in-use position after same is pivoted upwards to said position.

2 Claims, 6 Drawing Sheets

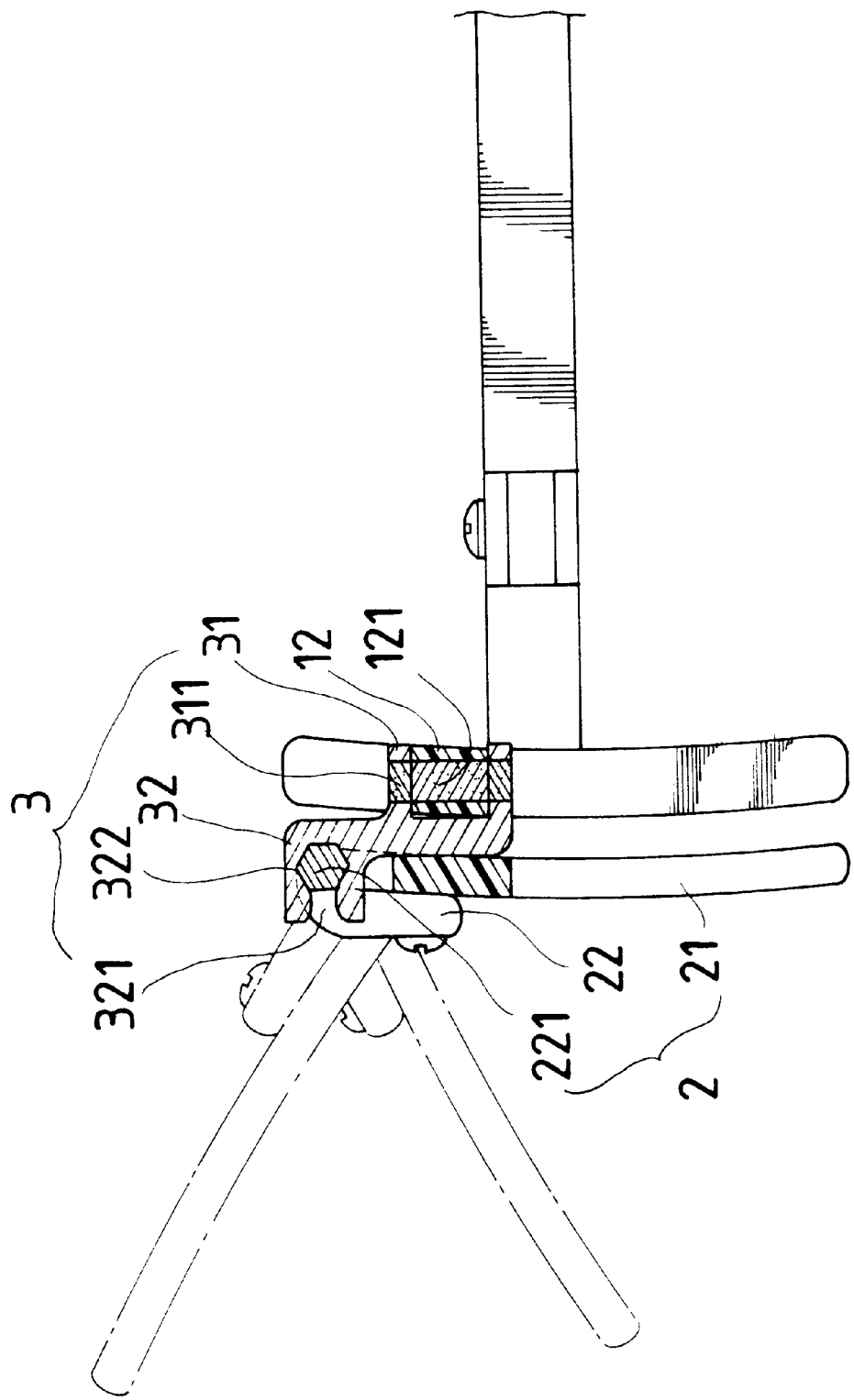
F I G. 3

EYEGLASSES FRAME HAVING AUXILIARY EYEGLASSES

BACKGROUND OF THE INVENTION

The present invention relates to an auxiliary rim, which is pivoted to a frame of eyeglasses, such that it can be pivoted on the frame between an open not-in-use position and an in-use position.

People having shortsightedness or long-sightedness have to wear eyeglasses. The eyeglasses have a main frame having lens fitted thereto. In order to prevent sunlight from hurting the eyes, the eyeglasses can have an auxiliary rim fitted thereto; sunglasses are fitted to the auxiliary rim. The auxiliary rim is usually removable such that the user can separate it from the main frame of the eyeglasses when the sunlight is not very strong.

Referring to FIG. 4, a heretofore known auxiliary rim 20 has magnets 201 at two ends of the rim 20. A main eyeglasses frame 10 has magnets 101 also at two ends of a rim thereof. Thus, the auxiliary rim 20 can be removably fitted to the main frame 10 by means of the attraction between the magnets 101 and 201.

Referring to FIGS. 5 and 6, another heretofore known auxiliary rim 40 has backward extensions 401 at two ends thereof. The backward extensions 401 each has a magnet 402 fitted thereto. A main frame 30 has magnets 301 on a rear side corresponding to the magnets 402 of the auxiliary rim 40. Thus, the auxiliary rim 40 can be removably fitted to the main frame 30 as shown in FIG. 6.

Referring to FIG. 7, a third heretofore known auxiliary rim 60 has supporting extensions 601 at two ends thereof Each of the supporting extensions 601 has a magnet 602 thereon. A main frame 50 also has magnets 501 at two ends thereof such that the rim 60 can be removably connected to the main frame 50 with the magnets 602 attracted to the magnets 501 and the supporting extensions 601 resting on the main frame 50.

It is found that the above three auxiliary rims have a common undesirable feature. The auxiliary rims have to be separated from the main frame when not in use and fitted back to the main frame when they have to be used. It is very inconvenient for the user.

SUMMARY OF THE INVENTION

Therefore, it is a main object of the present invention to provide a pair of auxiliary eyeglasses for an eyeglasses frame such that the auxiliary eyeglasses can be located at a not-in-use position without having to be removed from the main frame when it is not in use.

The eyeglasses frame has a bridge having a magnet inserted therein. A connecting member is connected to the bridge; the connecting member has two rear connecting plates each having a magnet. The bridge is inserted into between the connecting plates; the magnets made the connection of the connecting member to the bridge firmer.

The connecting member has a resilient front connecting part. The front connecting part has a holding room, which has a polygon-shaped inner wall.

The auxiliary eyeglasses have lens and a connecting rod member connecting the lens. The connecting rod member has a polygon-shaped intermediate portion received in the holding room. Thus, when the auxiliary eyeglasses is pivoted upwards on the connecting member to a not-in-use position, same can be located in the not-in-use position due to the polygon shapes of both the connecting rod intermediate portion of the auxiliary eyeglasses and the holding room of the connecting member.

BRIEF DESCRIPTION OF THE DRAWINGS

The present invention will be better understood by reference to the accompanying drawings, wherein:

FIG. 3 is a cross-sectional view of the eyeglasses frame with the auxiliary rim fitted thereto according to the present invention.

DESCRIPTION OF THE PREFERRED EMBODIMENTS

Figure 1:
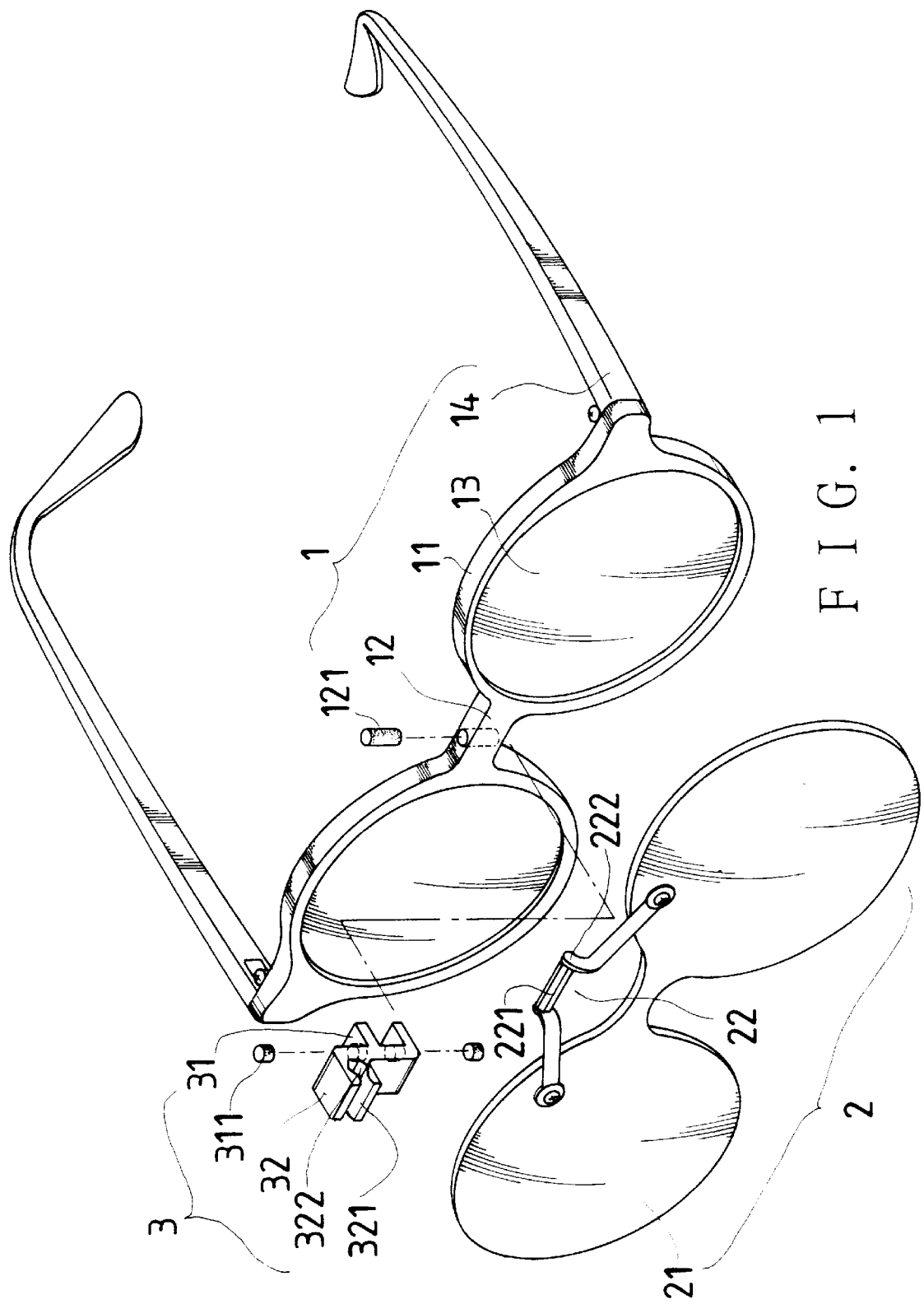
FIG. 1 is an exploded perspective view of an eyeglasses frame and the auxiliary rim of the present invention.
Figure 2:
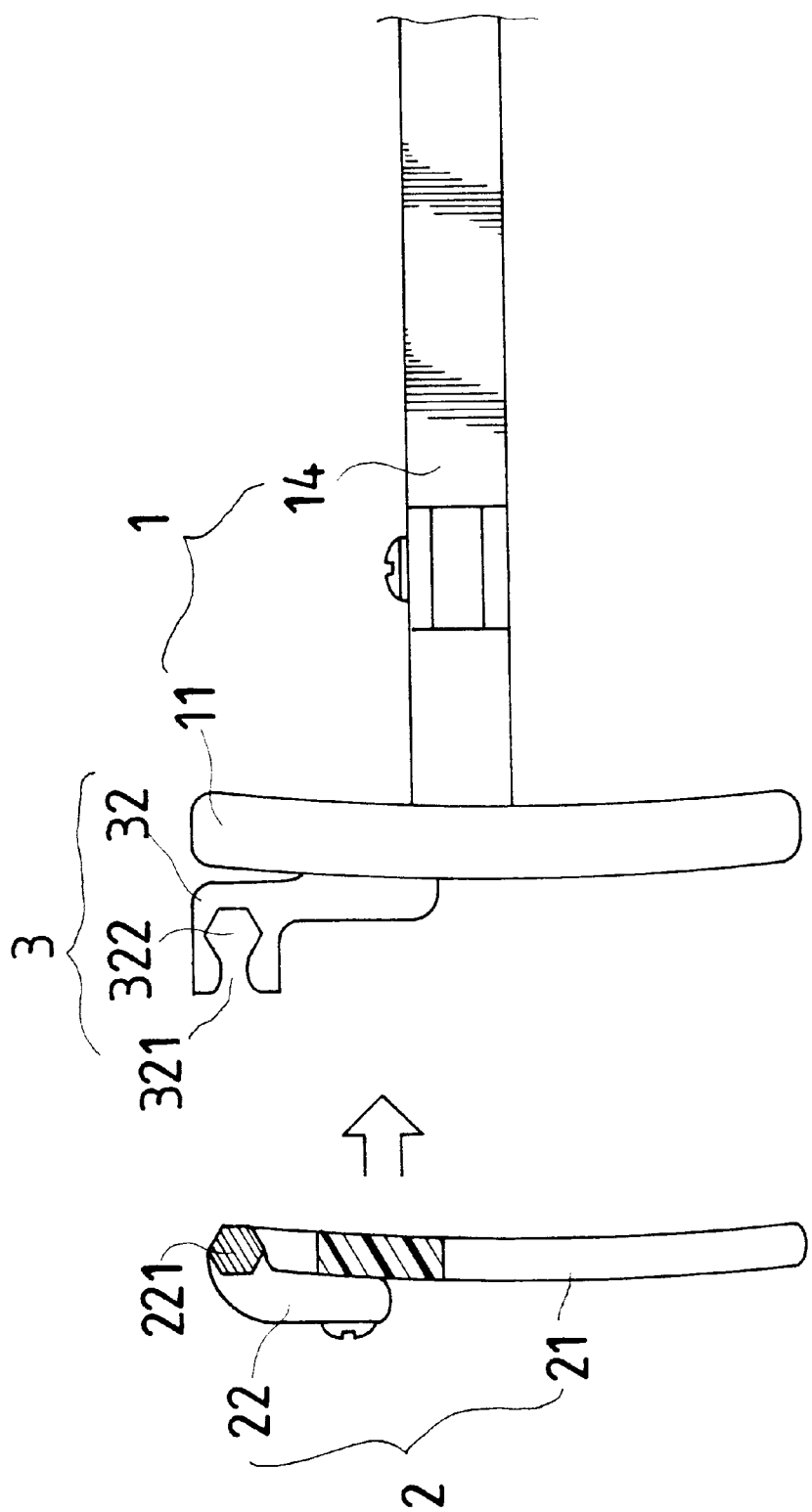
FIG. 2 is a cross-sectional view of the eyeglasses frame and the auxiliary rim of the present invention.
Figure 4:
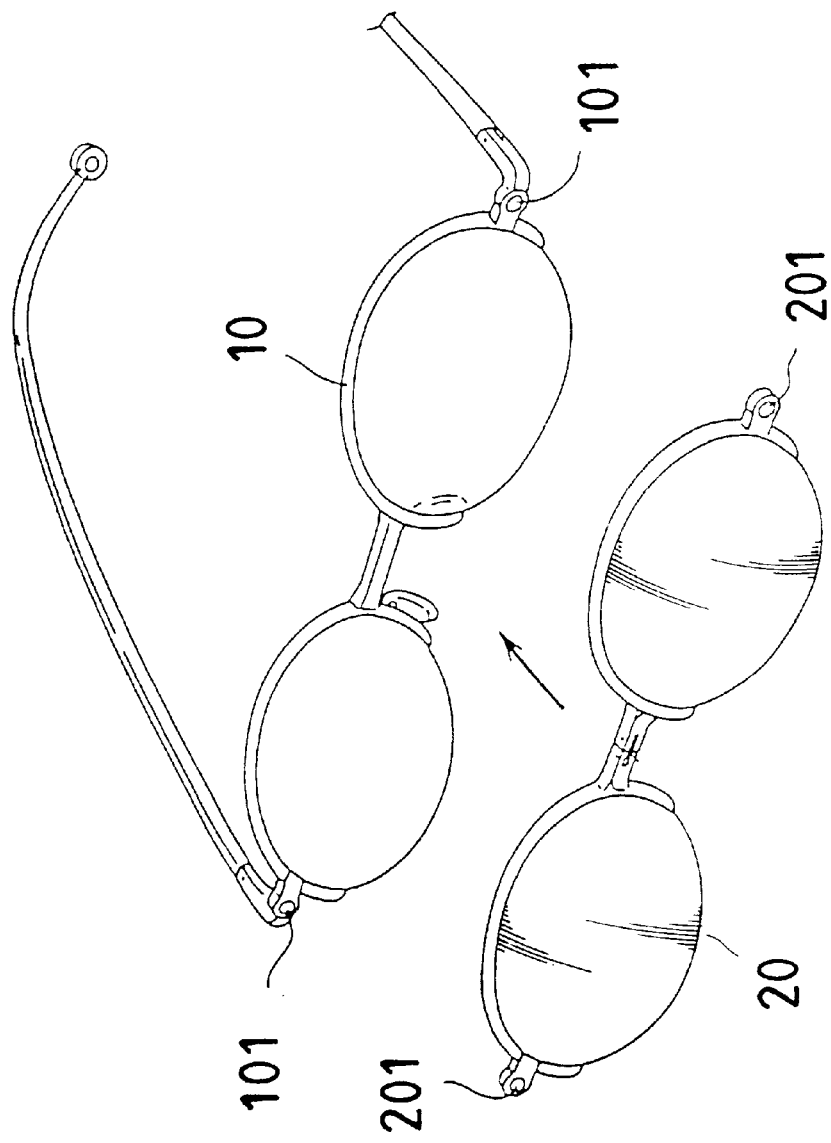
FIG. 4 is an exploded perspective view of a heretofore known eyeglasses frame and auxiliary rim in the Background.
Figure 5:
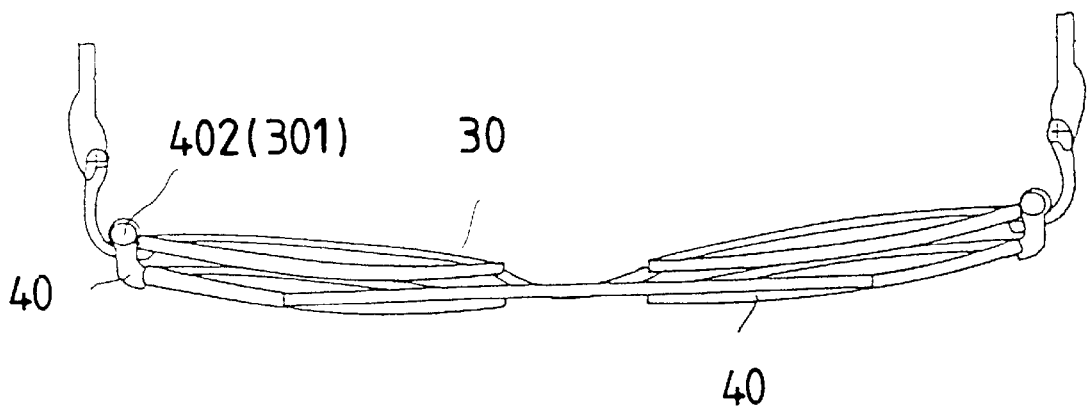
FIG. 5 is a top view of another heretofore known eyeglasses frame and auxiliary rim in the Background.
Figure 6:
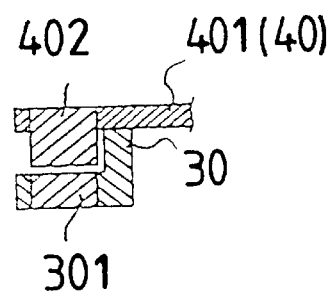
FIG. 6 is a fragmentary cross-sectional view of the eyeglasses in FIG. 5.
Figure 7:
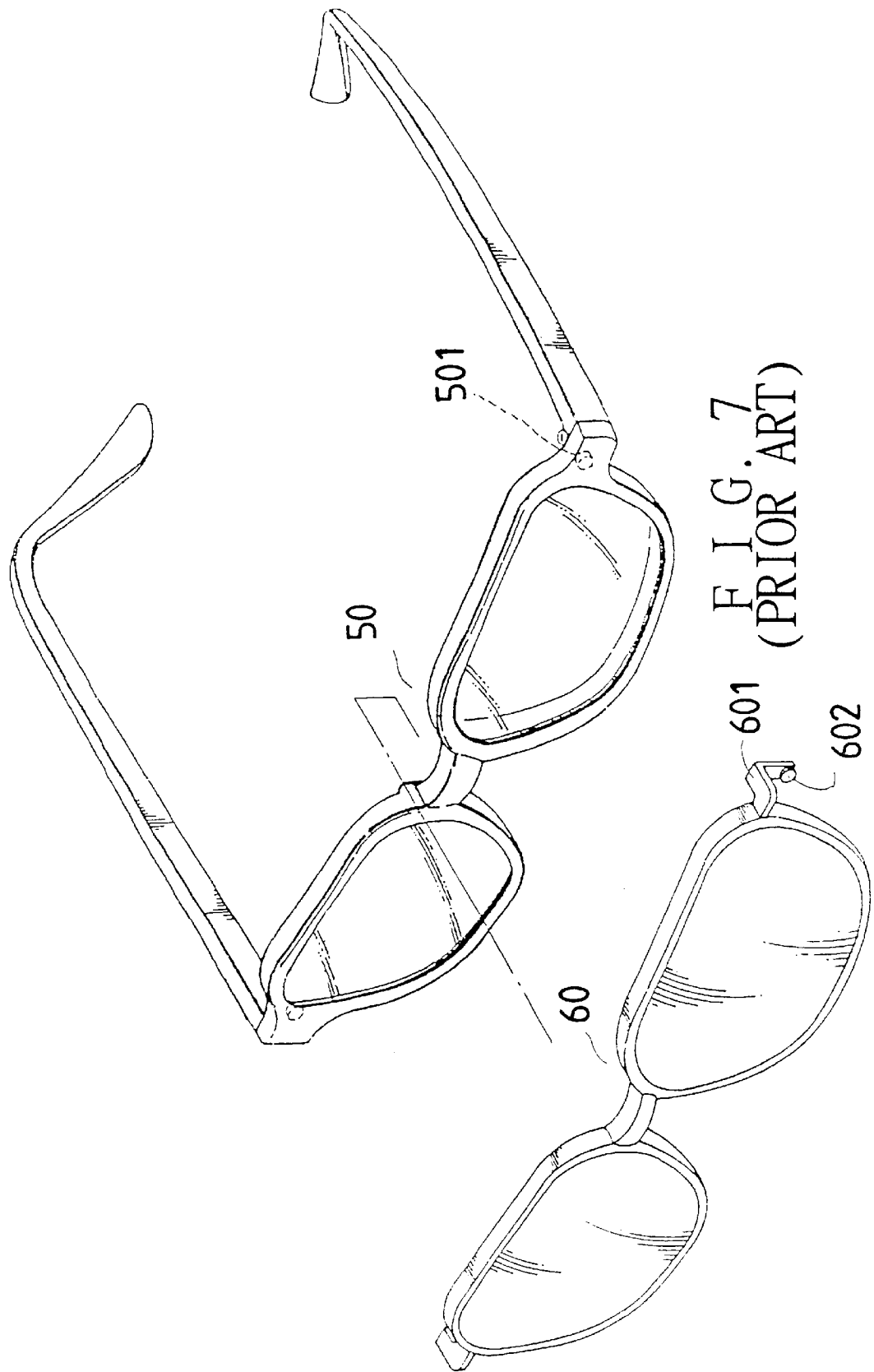
FIG. 7 is an exploded perspective view of a third prior art eyeglasses frame and auxiliary rim in the Background.

Referring to FIGS. 1,2 and 3, an eyeglasses frame having a pair of auxiliary eyeglasses of the present invention comprises a main frame 1, a pair of auxiliary eyeglasses 2 and a connecting member 3.

The main frame 1 has rims 11, a bridge 12 connecting the rims 11, lens 13 fitted on the rims 11 and temples 14. A magnetic member 121 is inserted into a hole of the bridge with two ends thereof exposed.

The auxiliary eyeglasses 2 have lens 21 and a connecting rod member 22 connected to an upper portion of the lens 21. The connecting rod member 22 ha two confining ends 222, an intermediate portion 221 between the confining ends 222. The intermediate portion 221 has a polygon shape. The confining ends 222 are bigger than the circumference of the intermediate portion 221.

The connecting member 3 has two rear connecting plates 31 and a front connecting part 32. The rear connecting plates 31 has a space in between, which space is formed such that the bridge 12 of the main frame 1 can be passed thereinto and firmly received therein. The rear connecting plates 31 each has a magnetic member 311 inserted thereinto such that the connecting member 3 can be connected to the bridge 12 more firmly by means of the attraction between the magnetic members 121 and 311. The front connecting part 32 is resilient, and has a holding room 322 and an opening 321 in communication with the holding room 322. The holding room 322 has an inner wall having a polygon shape. The size of the holding room 322 is smaller than the intermediate portion 221 so that the intermediate portion 221 of the connecting rod member 22 of the auxiliary eyeglasses 2 can be firmly received therein. Because the front connecting part 32 is resilient, the intermediate portion 221 can be made to be slightly wider than the holding room 322.

In combination, the connecting member 3 is fitted to the main frame 1 from the rear connecting plates 31. The auxiliary eyeglasses 2 is pivoted on the connecting member 3 by passing the intermediate portion 221 through the opening 321 and locating same in the holding room 322; the confining ends 222 cannot move into the holding room 322 so they can prevent the auxiliary eyeglasses 2 from moving sideways.

When the user needs to use the auxiliary eyeglasses 2 to protect his eyes from strong sunlight, he/she pivots the same towards the lens 13 of the main eyeglasses. When the user does not need to use the auxiliary eyeglasses 2, he/she pivots the same upwards; the auxiliary eyeglasses 2 can be located in position after the pivotal movement due to the polygon shape of both the holding room inner wall and the connecting rod member intermediate portion.

From the above description, the main eyeglasses frame having the auxiliary rim can be known to have advantages over the prior art one: the auxiliary rim can be pivoted to a not-in-use position without having to be detached from the main frame when same is not-in-use; and the polygon shapes of both the connecting rod member intermediate portion and the holding room inner wall can locate the auxiliary eyeglasses in position after the pivoted movement.

What is claimed is:

1. An eyeglasses frame with auxiliary eyeglasses, comprising:

(1) a main frame, said main frame having main lens fitted to rims thereof, said main frame having a bridge between said rims;

(2) a connecting member fitted to said bridge of said main frame, said connecting member having two rear connecting plates for said bridge to be inserted into therebetween, said connecting member having a resilient front connecting part having a holding room and an opening, said holding room being in communication with said opening, said holding room having an inner wall with polygon shape;

(3) an auxiliary eyeglasses having auxiliary lens, said auxiliary eyeglasses having a connecting rod member connected to said lens, said connecting rod member having an intermediate portion having a polygon shape, said intermediate portion being received in said holding room, said intermediate portion being slightly bigger than said holding room for permitting said auxiliary eyeglasses to be located in a not-in-use position after same is pivoted upwards on the connecting member due to said polygon shapes of both said inner wall and said intermediate portion.

2. The eyeglasses frame with auxiliary eyeglasses as claimed in claim 1, wherein said bridge of said main frame and said rear connecting plate of said connecting member each has a magnet fitted thereto for permitting said connecting member to be secured to said bridge by magnetic attraction of said magnets.

\* \* \* \* \*